United States Patent [19]
Bedin

[11] 4,437,289

[45] Mar. 20, 1984

[54] AUTOMATIC MACHINE FOR CAPPING AND LABELLING BOTTLES OR LIKE CONTAINERS

[75] Inventor: Jean Bedin, Bordeaux, France

[73] Assignee: Etablissements Larrieubedin "La Girondine", Le Bouscat, France

[21] Appl. No.: 317,314

[22] Filed: Nov. 2, 1981

[30] Foreign Application Priority Data

Nov. 7, 1980 [FR] France .................. 80 23821

[51] Int. Cl.³ .................. B67B 5/00; B65B 7/28; B65B 61/00
[52] U.S. Cl. .................. 53/64; 53/137; 53/167; 53/308
[58] Field of Search .................. 53/137, 51, 167, 64, 53/295, 308, 307, 306, 128

[56] References Cited

U.S. PATENT DOCUMENTS

| | | | |
|---|---|---|---|
| 3,415,034 | 12/1968 | Schmitt | 53/307 X |
| 3,777,449 | 12/1973 | Sindermann | 53/306 X |
| 3,837,141 | 9/1974 | Lorieux | 53/307 |
| 3,871,943 | 3/1975 | Zodrow | 53/137 X |
| 4,285,186 | 8/1981 | Desom | 53/307 X |

*Primary Examiner*—Horace M. Culver
*Attorney, Agent, or Firm*—Holman & Stern

[57] ABSTRACT

Machine for automatically capping and labelling bottles or like containers comprising, in addition to the labelling and capping device, apparatus for orienting the caps synchronized with said labelling and capping device, and for holding the oriented caps and depositing them on the bottles maintained fixed with respect to the axes of the capping heads.

5 Claims, 7 Drawing Figures

AUTOMATIC MACHINE FOR CAPPING AND LABELLING BOTTLES OR LIKE CONTAINERS

BACKGROUND OF THE INVENTION

1. Field Of The Invention

The invention relates to an automatic machine for capping and labelling bottles or like containers. Its object is to ensure precise capping and labelling in those cases where the cap presents signs or patterns with respect to which the caps (for example four flat pleats symmetrically in two's) and labels are to be disposed in determined manner.

2. Description Of The Prior Art

Champagne bottles on which the caps bear a stamp on which the producer's name is printed must be centered with respect to the pleating of the cap and to the different labels.

In known machines, the bottles bearing their caps are oriented by rotation about their axis so as to come, once, in front of the capping station, then, a second time, in front of the labelling station, as desired.

This double orientation results in defects or imprecisions in the relative positions of the pleats with respect to the wording and of the labels with respect to the pleats, due, in particular, to the relatively heavy weight of the bottles and therefore the inertia rendering the stops of their movement of rotation, imprecise.

BRIEF SUMMARY OF THE INVENTION

The gist of the invention consists in that the cap, which is a light member, will be easier to lock in rotation with precision than the bottle, and the machine resulting from this idea is characterised in that it comprises, in addition to the conventional labelling and capping means, means for orienting the caps synchronized with said labelling and capping means, and means for holding the oriented caps and deposit them on the bottles maintained fixed with respect to the axes of the capping heads.

The means for orienting the caps may be constituted by support pieces of any desired, precise geometric form, driven in rotation by the general motor of the machine, via a clutch-brake assembly, itself controlled by a cell sensitive to a mark on each cap.

One cell may be provided per support piece and a plurality of support-cell groups may be mounted on a rotating platform so as to increase the capacity of the orienting means.

In a particularly advantageous embodiment, such as multi-station rotating machine of the carousel type, the rotating orienting platform is mounted between the inlet cross and the outlet cross of a labelling machine, and the means for holding the oriented caps rotate with the platform bearing support elements supporting the bottles to be labelled.

In this embodiment, the means for holding the oriented caps may advantageously be mounted coaxial with respect to the capping heads and to the bottle supports.

BRIEF DESCRIPTION OF THE DRAWINGS

The invention will be more readily understood on reading the following description with reference to the accompanying drawings, wherein.

DETAILED DESCRIPTION OF THE PREFERRED EMBODIMENT OF THE INVENTION

Figure 1:
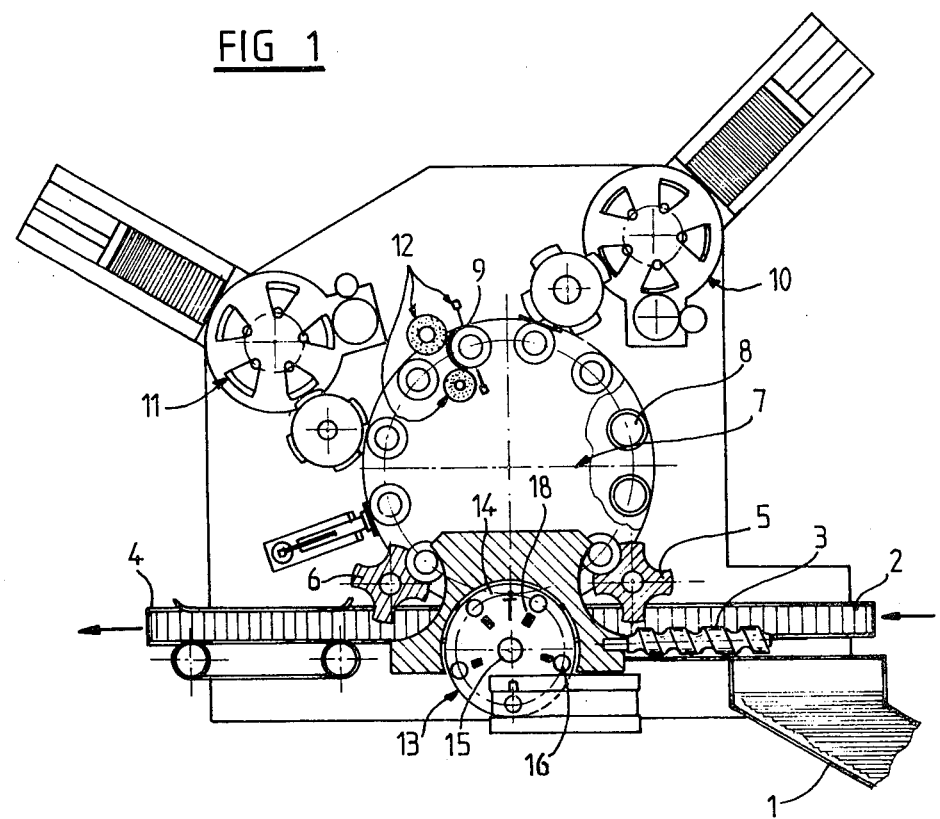
FIG. 1 is a schematic plan view of the machine of the invention with parts broken away.
Figure 4:
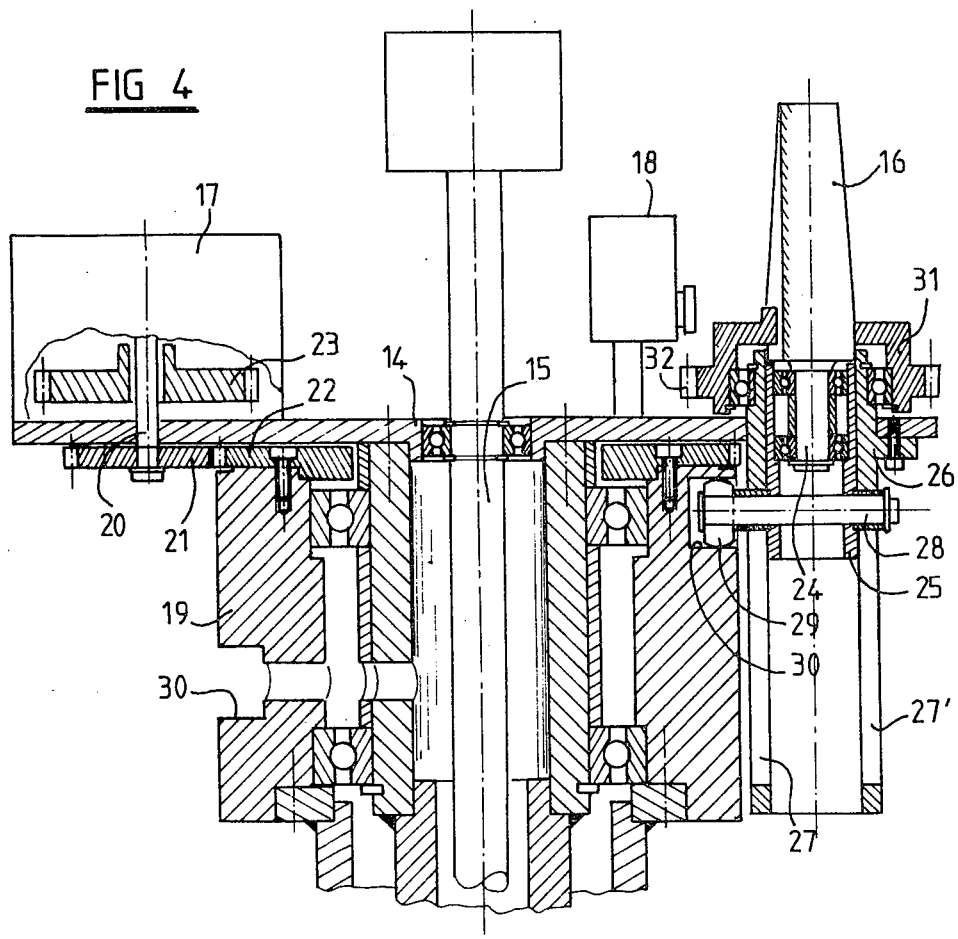
FIG. 4 is a cross-sectional view taken along line IV—IV of FIG. 3.
Figure 3:
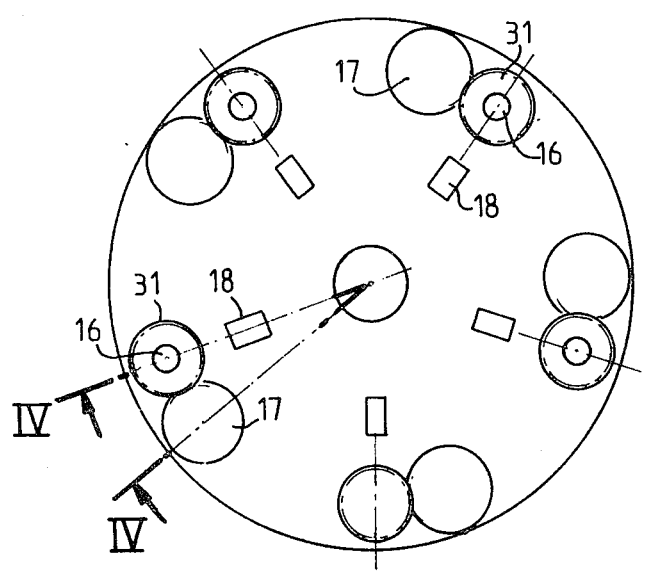
FIG. 3 is a schematic plan view of the cap orienting device of the machine of FIG. 1.
Figure 5:
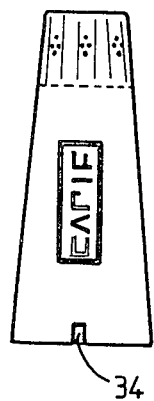
FIG. 5 is an elevational view in detail of a cap presenting spot and stamp.
Figure 6:
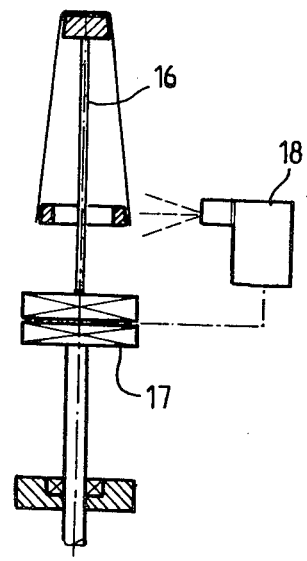
FIG. 6 is a schematic view of the assembly shown in FIG. 4.
Figure 7:
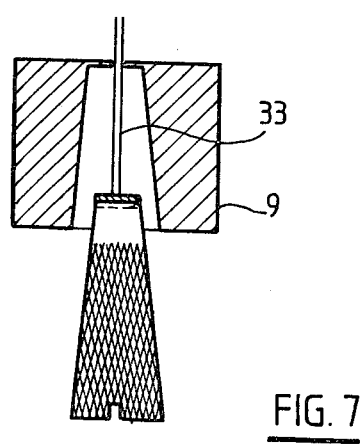
FIG. 7 is a schematic elevational and partly cross-sectional view of a capping head and a central nozzle.

Referring now to the drawings and as shown in FIGS. 1, 4 and 7, the machine of the invention essentially comprises a magazine 1 for loading the caps, an endless conveyor chain 2 for guiding the bottles, with an Archimedean screw 3 for selection or for setting the speed, an endless conveyor chain 4 for removing the bottles, an inlet cross 5 and an outlet cross 6, a carousel 7 bearing support 8 and, above the support, the capping heads 9 inside which a nozzle 33, connected to a source of vacuum, is mounted to move vertically, coaxially to said heads, a labelling device 10, a counter-labelling device 11 and a plurality of brushes and/or foam rollers 12 for smoothing the labels.

Between the inlet and outlet crosses 5 and 6 respectively, the orienting, or indexing, apparatus 13 is disposed, constituted by a platform 14 mounted to rotate on a fixed pin 15. This platform 14 bears five groups of indexing members each constituted by a geometrically strict, very light cap support 16, a clutch-brake assembly 17 and a photoelectric cell 18. The cylinder, locus of the vertical axes of the supports 8 and the capping heads 9, is tangential along the vertical line T to the cylinder, locus of the axes of the cap supports 16.

The platform 14 is driven in rotation above a fixed column 19 by the motor which also rotates the carousel 7 and the labelling apparatus 10, 11. The pin 20 of the clutch-brake assembly 17 bears at its lower end a gear 21 which meshes with a large gear 22 fast with the fixed upright 19. On the pin 20 are mounted two electromagnets due to which a toothed ring 23 may be driven in rotation or braked and stopped. The electromagnet which ensures coupling, therefore drive of the gear 23, is controlled by an inductive pick-up (not shown) which detects the presence of a cap on the support 16, and the other electromagnet which ensures braking, therefore blocking of the gear 23, is controlled by the photocell 18. The cap support 16 is mounted to rotate, via the stem 24, in a cylindrical sleeve 25 with which it rotates. This sleeve 25 is itself mounted to slide in an outer sleeve 26 fast with the platform 14 and provided with two diametrically opposite vertical slots 27, 27'. A rod 28 fast with the sleeve 25 may move in these slots 27, 27' and bears a roller 29 which moves in a cam-groove 30 made in the upright 19.

At the base of the support 16 is provided a ring 31 mounted to rotate on the sleeve 26 and bearing a toothed ring 32 which meshes with the ring 23 of the clutch-brake assembly. The support 16 is arranged to slide freely in this ring 31 but to be driven in rotation when this ring rotates.

Figure 2:
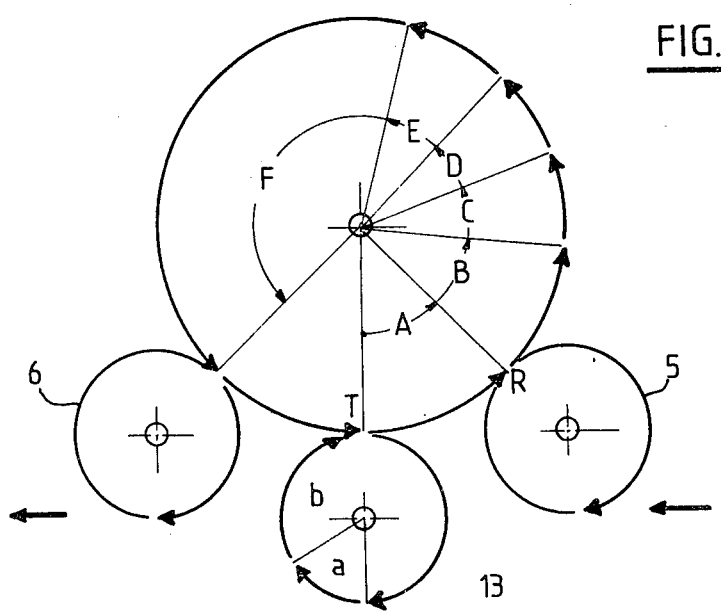
FIG. 2 is a diagram indicating the different phases of operation of the machine of FIG. 1.

The machine which has just been described operates as follows:

The caps stacked in the magazine 1 are automatically distributed on the supports 16 of the rotating platform 14. As soon as the inductive pick-up placed in front of a support 16 detects the presence of a cap on this support, it excites the electromagnet, provoking the mutual rotation of the ring 23 and the gear 21 which, forming a satellite gear mechanism, is always driven in rotation. The ring 32 is then driven by the ring 23 and the support 16, carrying a cap, rotates about its axis in front of the cell 18. When the mark, constituted by a rectangular spot 34 on the cap comes on the optical axis of the cell 18, the latter excites the electromagnet of the clutch-brake assembly 17, which provokes blocking of the gear 23, thereby stopping the rotation of the support 16 and of its cap. The latter is then strictly positioned with respect to the capping and labelling stations. This phase of orientation of the cap is carried out in the course of rotation of the platform 14 represented by the sector *a* in FIG. 2.

At the end of this period of orientation, the displacement of the roller 29 on the cam 30 causes the assembly constituted by the sleeve 25 and the support 16 to descend. During this descent, the cap, which is no longer supported by the support, rests by its edge on the upper face of the ring 31. When it arrives at point T (FIGS. 1 and 2), the support 16 has descended completely, with the result that its upper part is at a level slightly below that of the upper face of the ring 31. This descent phase of the support is carried out on sector *b* of FIG. 2.

At that moment, a capping head 9 and a central nozzle 33 are located above the cap disengaged from its support and the nozzle is placed on the cap and retains it by suction. The nozzle may then move the cap after a slight rise, so as to disengage the base of the cap from the support 31 and, in the course of rotation of the platform 7 corresponding to the sector A (FIG. 2), the nozzle 33 with the cap rises inside the capping head 9.

When the assembly composed of the capping head 9, nozzle 33 and cap arrives at point R (FIG. 2), a bottle, coming from conveyor chain 2 and selected by the screw 3 and transferred by the cross 5, is located on a support 8 which is plumb with the above-mentioned assembly, and coaxial thereto. In the course of rotation of the platform 7 corresponding to sector B (FIG. 2), the nozzle 33 places the cap on the bottle and the head 9 descends into capping position.

Capping is carried out in the course of rotation corresponding to sectors C and D (FIG. 2), with, for example, formation of four pleats followed by flattening of the pleats.

What is claimed is:

1. Machine for automatically capping and labelling bottles or like containers comprising, a machine frame, labelling means mounted on the frame for applying labels to the bottle, capping means mounted on the frame for applying caps on the bottle, bottle support means mounted on the frame, bottle feeding means for feeding bottles successively onto said bottle support means and removing said bottles therefrom, means for conveying said bottle support means to a labelling position adjacent said labelling means and under said capping means, cap support means mounted on said frame, cap feeding means for successively feeding said caps to said cap support means, cap orienting means mounted on said frame for orienting said cap support means having caps thereon with respect to a predetermined position, cap holding means mounted on said frame for engaging and holding a cap in the oriented position and conveying it to a bottle on said support means and depositing the cap onto said bottle, and power drive means for synchronously driving the above said means.

2. The machine as claimed in claim 1 wherein said cap orienting means comprises, said cap support means has a precise geometric shape conforming to the shape of the cap and is rotatably mounted to rotate substantially about its central axis, a clutchbrake assembly operatively mounted between said rotatable cap support means and said drive means to control the rotation of said cap support means, and a photoelectric cell for detecting a mark on each cap and operatively connected to said drive means to control said clutchbrake assembly so that said clutchbrake assembly stops rotation of said cap support means upon detection of said mark by said photocell.

3. The machine as claimed in claim 2 wherein a plurality of said cap support means and photocells are provided and are mounted in circumferentially spaced relationship on a rotatable platform, one photocell being provided for each cap support means.

4. The machine as claimed in claim 1 wherein said bottle feeding means comprises an inlet and an outlet rotatable bottle engaging cross-shaped member in spaced relation with respect to each other, said rotatable platform is mounted substantially between said cross-shaped members, and said cap holding means and bottle support means are mounted on a carousel type support rotatably mounted on said frame to convey said bottle support means under said capping means.

5. The machine as claimed in claim 4 wherein said capping means comprises a capping head, and said cap holding means for said oriented caps, said capping head and said bottle support means are coaxial.

* * * * *